United States Patent Office 3,781,281
Patented Dec. 25, 1973

---

3,781,281
2-ARYLIDENE - 1,3-DITHIOLES AND PREPARATION THEREOF FROM ACETYLENES, CARBON DISULFIDE, AND AROMATIC ALDEHYDES IN THE PRESENCE OF ALIPHATIC PHOSPHINES
Harris Dale Hartzler, Wilmington, Del., assignor to E. I. du Pont de Nemours and Company, Wilmington, Del.
No Drawing. Continuation-in-part of abandoned application Ser. No. 55,596, July 16, 1970. This application Nov. 8, 1972, Ser. No. 304,596
Int. Cl. C07d 71/00
U.S. Cl. 260—240 F          15 Claims

ABSTRACT OF THE DISCLOSURE

Disclosed herein is a new process for making 2-arylidene-1,3-dithioles, novel products made thereby and a utility for the products, i.e., the inhibition of vinyl polymerization. The process comprises reacting an aromatic aldehyde or dialdehyde with carbon disulfide and an acetylenic compound in the presence of a trihydrocarbylphosphine.

RELATED APPLICATION

This application is a continuation-in-part of my copending application Ser. No. 55,596, filed July 16, 1970, now abandoned.

BACKGROUND OF THE INVENTION

(1) Field of the invention

This invention encompasses a new process for making 2-arylidene-1,3-dithioles (otherwise, 5-aryl-1,4-dithiafulvenes) and the novel products made thereby.

(2) Description of the prior art

Kirmse and Horner, Ann., 614, 4 (1958), have employed radiation to prepare certain 2-arylidene-1,3-dithioles, according to the following representation:

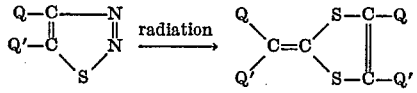

As can readily be seen, both Q substituents in the product must be identical, as must both Q' substituents. In conformance with the arylidenedithiole structure, furthermore, either the Q or the Q' substituent must be hydrogen. Such products are not contemplated herein as such, although they can be made by the disclosed novel process: see Example 23.

SUMMARY OF THE INVENTION

The products and process of this invention can be better understood with reference to the following equation and structural representations:

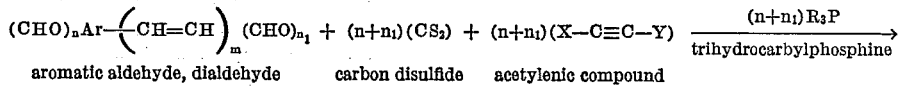
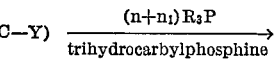
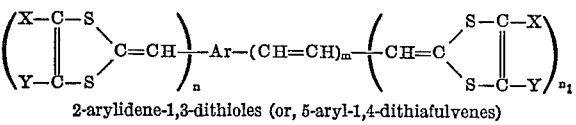

2-arylidene-1,3-dithioles (or, 5-aryl-1,4-dithiafulvenes)

wherein

Ar is a monovalent or divalent benzene radical unsubstituted or substituted with halogen, lower alkyl, lower alkoxy, or nitro, or a monovalent or divalent pyridine radical;

X and Y are hydrogen, lower alkoxycarbonyl, phenyl, carboxyl, cyano, or lower perfluoroalkyl;

the R's, which may be the same or different, are lower alkyl, cycloalkyl of 5 or 6 carbons or phenyl(lower alkyl);

$n$ is 0 or 1;
$n_1$ is 0 or 1;
$(n+n_1)$ is 1, 2; and
$m$ is 0 or 1.

In these definitions, "lower" indicates a group having from 1 through 7 carbons.

The novel products contemplated herein are all those 2-arylidene-1,3-dithioles having the structure represented above with the provisos that: when Y=H, $(n+n_1)=1$, and $m=0$, then X≠phenyl; and when X=H, $(n+n_1)=1$, and $m=0$, then Y≠phenyl.

DESCRIPTION OF THE PREFERRED EMBODIMENTS

The novel process of this invention comprises contacting and reacting an aromatic aldehyde or dialdehyde with carbon disulfide and an acetylenic compound in the presence of a trihydrocarbylphosphine. The carbon disulfide and phosphines apparently react to form a loose complex, $R_3P \cdot CS_2$. It is this loose complex with which the aldehyde and acetylenic compound react to form the novel compounds herein. The phosphine accepts the oxygen originally present in the aldehyde and is oxidized to the corresponding oxide, $R_3PO$. Although no particular order of reactant addition is necessary, it is preferred that the loose complex be preformed and that the aldehyde and acetylenic compound be added thereto.

Mole ratios of reactants are not critical. For good product yields, however, a mole ratio of about 1/1, or greater, $CS_2$/phosphine, should be employed. For best results, it is preferred to employ a mole ratio of between about 1.5 and 4.0 $CS_2$/phosphine. Usually, stoichiometric amounts of carbon disulfide, aldehyde and acetylene will be used, but excesses of any one or two of these reactants can be used if desired.

Because of the reactivity of the phosphines toward oxygen, it is desirable, although not absolutely necessary, to operate in an inert atmosphere such as nitrogen until the phosphine and carbon disulfide have been mixed. There is no need for an inert atmosphere thereafter.

Inert solvent or diluent can be used if desired, particularly when one or more of the reactants are relatively high-melting. Excess carbon disulfide can be used as a medium. Other operable solvents and diluents include ethers, such as ethyl ether, butyl ether, tetrahydrofuran, and 1,2-dimethoxyethane; nitriles, such as acetonitrile and propionitrile; esters, such as ethyl acetate and methyl propionate; hydrocarbons, such as benzene, toluene, pentane, and heptane; and halogenated hydrocarbons, particularly chlorinated hydrocarbons, such as chlorobenzene and 1,2-dichloroethane.

The process can be operated at temperatures between about −50° C. and 200° C. Preferably the temperature will be between about —20° C. and 150° C. The temperature will depend in part on the nature of the acetylenic reactant. For example, phenyl-substituted acetylenes usually require higher temperatures than alkoxycarbonyl-substituted acetylenes.

The process is conveniently operated in an open system at atmospheric pressure or under the autogenous pressure of a closed system. Higher or lower pressures can be used, but usually not advantage results.

The time required will vary greatly, depending on the temperature and the nature of the reactants, especially the acetylenic reactant. In some cases, the process will be essentially complete as soon as the reactants are mixed at room temperature. Even so, the reaction mixture is usually maintained for about 15 to 30 minutes to insure a complete reaction. Other systems may require several days to give a good yield of product. The progress of the reaction can be followed by any of a number of known methods, such as by infrared analysis of aliquot samples.

Contemplated aldehydes are those in which one or more —CHO groups are bonded to one or more nuclear carbons of an aromatic compound, either directly, or through a vinylene group. It is preferred that the —CHO group or groups be bonded directly to Ar. Cinnamaldehyde, $C_6H_5CH=CHCHO$, however, is a reactant wherein a —CHO group is bonded to Ar through a vinylene group.

Aldehydes included within the scope of this invention are:

o-, m-, and p-bromobenzaldehyde
3-bromo-4-butoxy-5-methoxybenzaldehyde
5-bromo-2-nitrobenzaldehyde
o-t-butoxybenzaldehyde
2-butoxy-3,5-diiodobenzaldehyde
p-s-butylbenzaldehyde
4-chloro-3-fluorobenzaldehyde
2,3-dichlorobenzaldehyde
2,6-dichloro-3-nitrobenzaldehyde
2,4-diethoxy-5-hexylbenzaldehyde
3,5-dimethyl-4-nitrobenzaldehyde
pentafluorobenzaldehyde
pentamethoxybenzaldehyde
2,4,5-trichloro-3,6-dimethoxybenzaldehyde
o-, m- and p-tolualdehyde
3,5-xylaldehyde (3,5-dimethylbenzaldehyde)
2,4,6-triethylbenzaldehyde
2,3,5,6-tetramethylbenzaldehyde
isophthalaldehyde
2-methoxy-5-methylisophthalaldehyde
5-nitroisophthalaldehyde
tetramethylisophthalaldehyde
phthalaldehyde
4-chlorophthalaldehyde
4,5-dimethoxyphthalaldehyde
2,5-dichloroterephthalaldehyde
2,5-diethoxyterephthalaldehyde
2,5-dimethylterephthalaldehyde
nitroterephthalaldehyde
triethylmethylterephthalaldehyde
2-pyridinecarboxaldehyde
3-pyridinecarboxaldehyde (nicotinaldehyde)
2,6-pyridinedicarboxaldehyde
2- and 3-pyridineacrolein All of the aldehydes described and/or listed herein react with carbon disulfide and an acetylenic compound in the presence of a phosphine, in the manner taught, to give 2-arylidene-1,3-dithioles. All such aldehydes are specifically included within the scope of this invention. Reactions of a wide range of aldehydes, characteristic of those included in the scope, are set out in the examples.

Monoaldehydes are preferred. Preferably, the aromatic aldehydes and dialdehydes contain no more than two substituents.

Acetylenic compounds included within the scope of this invention are:

acetylene
propiolic acid (propynoic acid)
phenylpropiolic acid
butyl phenylpropiolate
phenyl propiolate
3,3,3-trifluoropropyne
3,3,4,4,4-pentafluoro-1-butyne
3,4,4,4-tetrafluoro-3-(trifluoromethyl)-1-butyne
1,1,1-trifluorophenylpropyne
acetylenedicarboxylic acid
dihexyl acetylenedicarboxylate
diphenylacetylenedicarboxylate
perfluoro-2-hexyne
propiolonitrile
perfluoro-3-hexyne
perfluoro-2-heptyne
acetylenedicarbonitrile (dicyanoacetylene)
acetylenedicarbonitrile (butynedinitrile)

Preferred are acetylenes in which X is hydrogen, phenyl, lower alkoxycarbonyl, or lower perfluoroalkyl, and Y is hydrogen, phenyl or the same as X.

Phosphines included within the scope of this invention are:

trimethylphosphine
triethylphosphine
triisopropylphosphine
tri-s-butylphosphine
tris(2-methylbutyl)phosphine
tripentylphosphine
triisopentylphosphine
triheptylphosphine
ethyldimethylphosphine
diethylmethylphosphine
diethylisopentylphosphine
ethylisobutylisopropylphosphine
butyldipropylphosphine
tricyclopentylphosphine
tris(methylcyclopentyl)phosphine
tricyclohexylphosphine
tribenzylphosphine
triphenethylphosphine
benzyldimethylphosphine
benzylbutylpropylphosphine
dibenzylbutylphosphine Preferred phosphines are those in which the R groups are primary or secondary lower alkyl or benzyl. Especially preferred are those in which the R groups are the same and are primary or secondary lower alkyl.

SPECIFIC EMBODIMENTS

The following nonlimiting examples are intended to illustrate the invention.

EXAMPLE 1

Dimethyl 2-benzylidene-1,3-dithiole-4,5-dicarboxylate

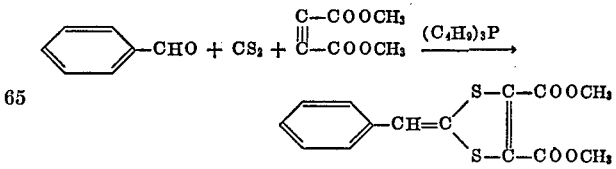

Tributylphosphine (20.2 g., 0.10 mole) was added dropwise over 10–15 minutes to 20 ml. (25.2 g., 0.33 mole) of carbon disulfide with stirring under nitrogen. Benzaldehyde (15 ml., 15.6 g., 0.15 mole) was added and the system was cooled to —5°. Dimethyl acetylenedicarboxylate (12.2 g., 0.086 mole) was added dropwise with stirring over about one hour. The mixture was stirred an hour at —5° after addition. Ether (about 50 ml.) was added, and the mixture was filtered to give 10.1 g. (38%) of yellow dimethyl 2-benzylidene-1,3-dithiole-4,5-dicarboxylate, M.P. 86–90°. Recrystallization from methanol raised the melting point to 94–95°.

Analysis.—Calcd. for $C_{14}H_{12}O_4S_2$ (percent): C, 54.52; H, 3.92; S, 20.79. Found (percent): C, 54.73; H, 3.91; S, 20.79.

$H^1$ NMR: Aromatic [5] at δ 7.3, exocyclic CH [1] at δ 6.50, and $CH_3$ [6] two peaks at δ 3.83.

UV: In ethanol, λ 405 (ε 1730), 322 (ε 17,700, and 233 nm. (ε 14,000).

IR: 1740 (s.), 1725 (s.), 1590 (s.), 1550 (m.), 1490 (m.), 1440 (m.), 1250 (s.), 1090 (m.), 1015 (m.), 1000 (m.), 920 (m.), 810 (m.), 770 (m.), 760 (m.), 750 (m.), 690 (m.).

EXAMPLE 2

Dimethyl 2-(4-methylbenzylidene)-1,3-dithiole-4,5-dicarboxylate

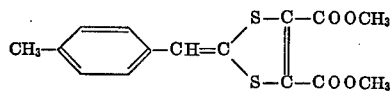

Tributylphosphine (20.2 g.) was added dropwise to 20 ml. of carbon disulfide under nitrogen. p-Tolualdehyde (15 ml., 15.3 g., 0.13 mole) was added, the mixture was cooled in ice, and a solution of 14.2 g. of dimethyl acetylenedicarboxylate in 10 ml. carbon disulfide was added, dropwise with stirring, over about three hours. Methanol (about 100 ml.) was added, and the mixture was filtered. The filtrate was cooled to —80° and the solid was separated by filtration to give 9.3 g. (29%) of orange dimethyl 2-(4-methylbenzylidene)-1,3-dithiole-4,5-dicarboxylate, M.P. 68–82°. Recrystallization from acetone raised the melting point to 85–87°.

Analysis.—Calcd. for $C_{15}H_{14}O_4S_2$ (percent): C, 55.88; H, 4.38; S, 19.90. Found (percent): C, 55.86; H, 4.44; S, 20.16.

$H^1$ NMR: $C-CH_3$ [3] at δ 2.32, $OCH_3$ [6] at δ 3.84, exocyclic CH [1] at δ 6.47, and aromatic CH [4] at δ 7.19.

UV: In ethanol, λ 407 (ε 1680), 320 (ε 18,700), and 233 nm. (ε 14,600).

IR: 1740 (s.), 1725 (s.), 1590 (s.), 1510 (m.), 1440 (s.), 1270 (s.), 1240 (s.), 1100 (m.), 1020 (m.), 990 (m.), 910 (m.), 850 (m.), 840 (m.), 825 (m.), 775 (m.), 760 (m.), 750 (m.), 710 (m.), 680 (m.).

EXAMPLE 3

Methyl 2-benzylidene-1,3-dithiole-4-carboxylate

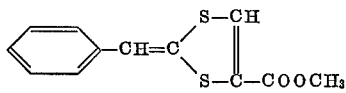

Tributylphosphine (20.2 g.) was added dropwise to 20 ml. of carbon disulfide, followed by 15 ml. of benzaldehyde. The mixture was chilled in ice, and dropwise addition of 9 g. (0.11 m.) of methyl propiolate was begun with stirring. A solid product began to precipitate immediately, and its presence made stirring difficult. Ethyl ether (ca. 50 ml.) was added, the mixture was allowed to warm to room temperature, and dropwise addition of methyl propiolate with stirring was completed. The mixture was chilled in ice and filtered to give a total of 9.5 (38%) of crude solid methyl 2-benzylidene-1,3-dithiole-4-carboxylate in three crops, the third being obtained by adding methanol to the previous filtrate and chilling to —70°.

After recrystallization from methanol the red product melted at 130–130.5°.

Analysis.—Calcd. for $C_{12}H_{10}O_2S_2$ (percent): C, 57.57; H, 4.03; S, 25.62. Found (percent): C, 57.64; H, 4.06; S, 25.63.

$H^1$ NMR: $OCH_3$ [3] at δ 3.83, exocyclic CH [1] two peaks at δ 6.6, and aromatic plus dithiole CH [6] at δ 7.32.

UV: In ethanol, λ 385 (ε2500), sh. 343 (ε 13,500), 324 (ε 16,500), and 227 nm. (ε 14,300). The spectrum in isooctane was virtually unchanged.

IR: 1730 (m.), 1710 (s.), 1580 (s.), 1570 (s.), 1490 (m.), 1440 (m.), 1340 (m.), 1290 (s.), 1210 (m.), 1200 (m.), 1160 (m.), 1060 (m.), 1035 (m.), 910 (m.), 845 (m.), 830 (m.), 820 (m.), 810 (m.), 770 (m.), 750 (m.), 725 (m.), 690 (m.).

Examples 4–16 were carried out by essentially the procedure illustrated in Examples 1–3. Tenth-molar quantities of phosphine, mono-aldehyde, and acetylenic reactant and excess carbon disulfide were used; 0.05 mole of each dialdehyde was used. The product and its properties, together with any significant variation in procedure, are given in each example.

EXAMPLE 4

Dimethyl 2-(4-chlorobenzylidene)-1,3-dithiole-4,5-dicarboxylate

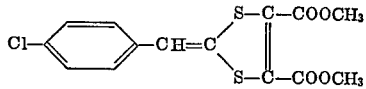

Tributylphosphine, carbon disulfide, p-chlorobenzaldehyde, and methyl acetylenedicarboxylate gave 24.0 g. (70%) of crude product, M.P. 72–79°. Recrystallization from methanol gave yellow product which melted at 95°.

Analysis.—Calcd. for $C_{14}H_{11}ClO_4S_2$ percent): C, 49.05; H, 3.23; S, 18.71; Cl, 10.31. Found (percent): C, 49.22; H, 3.32; S, 18.54; Cl, 9.95.

$H^1$ NMR: $OCH_3$ [6] at δ 3.89, exocyclic CH [1] at δ 6.47, and aromatic CH [4] centered at δ 7.28.

UV: In ethanol, λ 400 (ε 1830), sh. 345 (ε 17,100), 330 (ε 20,600), and 233 nm. (ε 15,400).

IR: Carbonyl at 1750 cm.$^{-1}$, C=C at 1600 and 1560 cm.$^{-1}$, and p-substituted aromatic absorption at 850 cm.$^{-1}$.

EXAMPLE 5

Methyl 2-(4-chlorobenzylidene)-1,3-dithiole-4-carboxylate

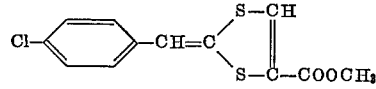

Tributylphosphine, carbon disulfide, p-chlorobenzaldehyde, and methyl propiolate gave 26.4 g. (93%) of yellow dithiafulvene, M.P. 158–159°. Recrystallization from methanol-acetone did not raise the melting point.

Analysis.—Calcd. for $C_{12}H_9ClO_2S_2$ (percent): C, 50.61; H, 3.18; S, 22.52; Cl, 12.45. Found (percent): C, 50.50; H, 3.26; S, 22.74; Cl, 12.51.

$H^1$ NMR: In hexadeuteriodimethyl sulfoxide, $OCH_3$ [3] at δ 3.37, exocyclic CH [1] two peaks at δ 6.2, dithiole CH [1] two peaks at δ 6.8, and aromatic CH [4] at δ 7.4.

UV: In ethanol, λ sh. 395 (ε 3360), 348 (ε 21,400), 337 (ε 20,700), and 232 nm. (ε 16,800).

IR: Carbonyl at 1720 cm.$^{-1}$, C=C at 1580 and 1560 cm.$^{-1}$.

EXAMPLE 6

Methyl 2-(2-nitrobenzylidene)-1,3-dithiole-4-carboxylate

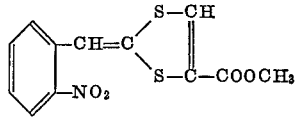

Tributylphosphine, carbon disulfide, o-nitrobenzaldehyde, and methyl propiolate in 50 ml. of ethyl ether solvent gave 29.9 g. (100%) of red product, M.P. 88–89°, which precipitated while the methyl propiolate was being added. Recrystallization from ethyl acetate raised the melting point to 96–99°.

*Analysis.*—Calcd. for $C_{12}H_9NO_4S_2$ (percent): C, 48.80; H, 3.08; N, 4.75; S, 21.70. Found (percent): C, 48.82; H, 3.26; N, 4.77; S, 21.31.

$H^1$ NMR: $OCH_3$ [3] at δ 3.80, exocyclic CH [1] at δ 6.98, and aromatic and dithiole CH [5] at δ 7.6 to 8.2.

UV: In ethanol, λ 385 (ε 6340), 335 (ε 9050), and 278 nm. (ε 5840). The spectrum was essentially the same in isooctane.

IR: 3080 (w.), 2980 (w.), 1730 (s.), 1610 (m.), 1575 (s.), 1510 (s.), 1470 (m.), 1440 (s.), 1340 (s.), 1285 (s.), 1270 (s.), 1250 (s.), 1210 (m.), 1190 (s.), 1145 (m.), 1060 (s.), 945 (m.), 910 (m.), 865 (m.), 860 (m.), 850 (m.), 815 (m.), 800 (m.), 785 (m.), 780 (m.), 770 (s.), 730 (s.), 700 (m.), 670 (m.).

EXAMPLE 7

Dimethyl 2-(2-nitrobenzylidene)-1,3-dithiole-4,5-dicarboxylate

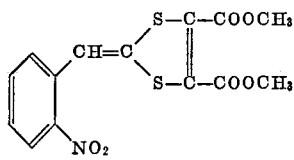

Substitution of dimethyl acetylenedicarboxylate for methyl propiolate in Example 6 gave 26.5 g. (78%) of yellow product, M.P. 115°, which precipitated during addition of the diester. Recrystallization from tetrahydrofuran raised the melting point slightly, to 115–116°.

*Analysis.*—Calcd. for $C_{14}H_{11}NO_6S_2$ (percent): C, 47.59; H, 3.14; N, 3.79; S, 18.15. Found (percent): C, 47.53; H, 3.12; N, 3.92; S, 18.29.

$H^1$ NMR: $OCH_3$ [6] at δ 3.83 and 3.89, exocyclic CH [1] at δ 6.99, and aromatic CH multiplet [4] at δ 7.3 to 8.15.

UV: In ethanol, λ 395 (ε 6060) and 320 nm. (ε 8050). IR: 1740 (s.), 1720 (s.), 1600 (s.), 1530 (s.), 1460 (m.), IR: 1740 (s.), 1720 (s.), 1600 (m.), 1200 (s.), 1100 m.), 1020 (m.), 980 (m.), 910 (m.), 860 (m.), 815 (m.), 770 (m), 760 (m.), 740 (m.), 685 (m.).

EXAMPLE 8

Tetramethyl 2,2′-(p-phenylenedimethylidyne)bis(1,3-dithiole-4,5-dicarboxylate)

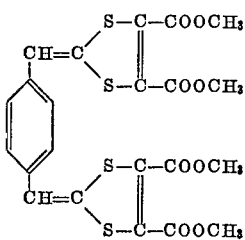

Tributylphosphine, carbon disulfide, terephthalaldehyde, and dimethyl acetylenedicarboxylate gave 16.0 g. (60%) of red dithiafulvene. After recrystallization from ethyl acetate the product melted at 220–225°.

*Analysis.*—Calcd. for $C_{22}H_{18}O_8S_4$ (percent): C, 49.05; H, 3.37; S, 23.82. Found (percent): C, 49.23; H, 3.52; S, 23.47.

$H^1$ NMR: $OCH_3$[6] at δ 3.90, exocyclic CH [1] at δ 6.5, and aromatic CH [2] at δ 7.3.

UV: In ethanol, λ 400 (ε 40,000) and 384 nm. (ε 44,000).

IR: 1760 (s.), 1730 (s.), 1590 (s.), 1510 (m.), 1430 (s.), 1410 (m.), 1240 (s.), 1140 (m.), 1090 (s.), 1010 (m.), 995 (m.), 920 (m.), 835 (m.), 790 (m.), 770 (m.), 750 (m.), 710 (m.).

EXAMPLE 9

Dimethyl 2,2′-(p-phenylenedimethylidyne)bis(1,3-dithiole-4-carboxylate)

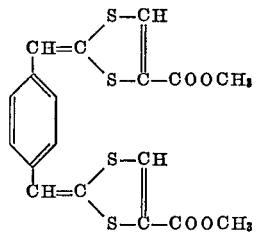

Substitution of methyl propiolate for dimethyl acetylene dicarboxylate in Example 8 gave 9.1 g. (43%) of product. After recrystallization from ethylene chloride the yellow product melted at 257–260°.

*Analysis.*—Calcd. for $C_{18}H_{14}O_4S_4$ (percent): C, 51.17; H, 3.34; S, 30.35. Found (percent): C, 51.07; H, 3.41; S, 29.60.

IR: 1710 (s.), 1570 (s.), 1540 (m.), 1430 (m.), 1410 (m.), 1250 (s.), 1210 (m.), 1190 (m.), 1050 (m.), 940 (m.), 830 (m.), 770 (m.), 730 (m.).

UV: In methylene chloride, λ sh. 403 (ε 43,000) and 389 nm. (ε 44,700).

EXAMPLE 10

Methyl 2-(3-phenyl-2-propenylidene)-1,3-dithiole-4-carboxylate

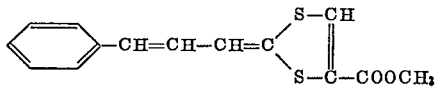

Tributylphosphine, carbon disulfide, cinnamaldehyde, and methyl propiolate in 100 ml. ethyl ether diluent gave 23.9 g. (86%) of crystalline yellow dithiole, M.P. 184–185°, which precipitated during the addition of the methyl propiolate.

*Analysis.*—Calcd. for $C_{14}H_{12}O_2S_2$ (percent): C, 60.84; H, 4.38; S, 23.21. Found (percent): C, 60.77; H, 4.45; S, 23.56.

$H^1$ NMR: $OCH_3$ [3] at δ 3.82, vinyl CH [3] δ 6.1 to 6.5, and aromatic and dithiole CH [6] at δ 7.3.

UV: In ethanol, λ 3.77 (ε 32,100), 3.63 (ε 32,900), and 250 nm. (ε 14,300).

IR: 1710 (s.), 1575 (s.), 1440 (m.), 1290 (s.), 1200 (m.), 1060 (m.), 960 (m.), 750 (m.), 730 (m.).

EXAMPLE 11

Methyl 2-(p-nitrobenzylidene)-1,3-dithiole-4-carboxylate

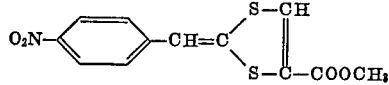

Tributylphosphine, carbon disulfide, p-nitrobenzaldehyde, and methyl propiolate in 100 ml. of ethyl ether diluent gave 19.0 g. of red, crystalline product, M.P. 216–217°, which precipitated during the addition of the methyl propiolate (dissolved in 10 ml. of ethyl ether). Recrystallization from acetone-tetrahydrofuran raised the melting point to 230–231°.

*Analysis.*—Calcd. for $C_{12}H_9NO_4S_2$ (percent): C, 48.8; H, 3.08; N, 4.74; S, 21.7. Found (percent): C, 48.8; H, 2.95; N, 4.75; S, 21.3.

The $H^1$ NMR spectrum of the product showed the methoxyl singlet [3] at δ 3.84, the exocyclic methine hydrogen [1] at δ 6.57, the dithiole ring hydrogen [1] at δ 7.47, and the aromatic $A_2B_2$ pattern [4] at δ 7.3–8.3.

EXAMPLE 12

Dimethyl 2-(4-pyridylmethylidyne)-1,3-dithiole-4,5-dicarboxylate

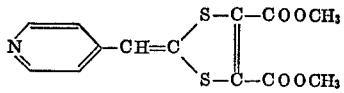

Tributylphosphine, carbon disulfide, 4-pyridinecarboxaldehyde, and dimethyl acetylenedicarboxylate in 150 ml. of ethyl ether at room temperature gave 14.1 g. (46%) of orange dimethyl 2-(4-pyridylmethylidyne)-1,3-dithiole-4,5-dicarboxylate, M.P. 140–141°. Recrystallization from ethanol raised the melting point to 142°.

Analysis.—Calcd. for $C_{13}H_{11}NO_4S_2$ (percent): C, 50.47; H, 3.59; N, 4.53; S, 20.73. Found (percent): C, 50.94; H, 3.59; N, 4.59; S, 20.17.

$H^1$ NMR: Methoxyl [6] at δ 3.80, vinyl hydrogen [1] at δ 6.31 and symmetrical 4-pyridyl pattern [4] in two areas δ 7 and 8.5.

EXAMPLE 13

Methyl 2-(4-pyridylmethylidyne)-1,3-dithiole-4-carboxylate

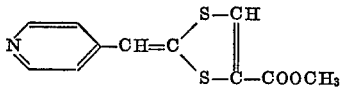

Substituting methyl propiolate for dimethyl acetylenedicarboxylate in essentially the procedure of Example 12 gave 13.8 g. (55%) of yellow methyl 2-(4-pyridylmethylidyne)-1,3-dithiole-4-carboxylate, M.P. 167–168°. Recrystallization from ethanol raised the melting point to 168–169°.

Analysis.—Calcd. for $C_{11}H_9NO_2S_2$ (percent): C, 52.56; H, 3.61; N, 5.57; S, 25.52. Found (percent): C, 53.00; H, 3.61; N, 5.81; S, 25.39.

$H^1$ NMR: $OCH_3$ [3] at δ 3.82, vinyl CH [1] at δ 6.45, and pyridyl and dithiole CH [5] at low field.

EXAMPLE 14

2-(p-nitrobenzylidene)-1,3-dithiole-4-carboxylic acid

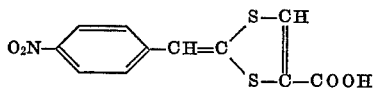

Tributylphosphine, carbon disulfide (in 100 ml. of tetrahydrofuran), p-nitrobenzaldehyde, and propiolic acid (in 10 ml. of tetrahydrofuran) gave 6.1 g. of crude red 2-(p-nitrobenzylidene)-1,3-dithiole-4-carboxylic acid. After recrystallization from tetrahydrofuran, the product melted at 201–202°.

Analysis.—Calcd. for $C_{11}H_7NO_4S_2$ (percent): C, 47.0; H, 2.51; N, 4.98; S, 22.8. Found (percent): C, 46.8; H, 2.47; N, 4.94; S, 22.9.

EXAMPLE 15

Ethyl 2-benzylidene-1,3-dithiole-5-phenyl-4-carboxylate

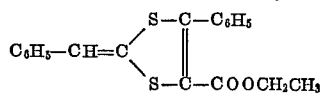

Tributylphosphine, carbon disulfide (in 100 ml. of ethyl ether), benzaldehyde, and ethyl phenylpropiolate (in 10 ml. of ethyl ether) gave 20.4 g. of yellow, crystalline ethyl 2-benzylidene-1,3-dithiole-5-phenyl-4-carboxylate, M.P. 110–114°. Recrystallizaton from ethanol raised the melting point to 119–120°.

Analysis.—Calcd. for $C_{19}H_{16}O_2S_2$ (percent): C, 67.0; H, 4.74; S, 18.8. Found (percent): C, 67.1; H, 4.76.

$H^1$ NMR: Methyl triplet [3] centered at δ 1.08, methylene ($CH_2$) quartet [2] centered at δ 4.09, exocyclic methine (CH) singlet [1] at δ 6.43, and aromatic multiplet [10] at δ 7.2 to 7.4.

IR: Carbonyl at 1730 cm.$^{-1}$ and double bond absorption at 1580 and 1540 cm.$^{-1}$.

EXAMPLE 16

Tetramethyl 2,2'-(tetrachloro-p-phenylenedimethylidyne)bis(1,3-dithiole-4,5-dicarboxylate)

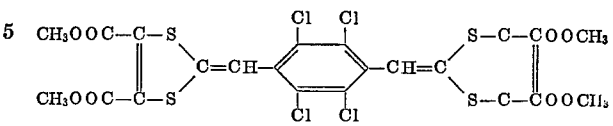

Tributylphosphine, carbon disulfide, tetrachloroterephthaldehyde (in 100 ml. of tetrahydrofuran), and dimethyl acetylenedicarboxylate (in 10 ml. of tetrahydrofuran) gave 10.7 g. of yellow tetramethyl 2,2'-(tetrachloro-p-phenylenedimethylidyne)bis(1,3 - dithiole - 4,5-dicarboxylate). After recrystallization from tetrahydrofuran the product melted at 245–246°.

Analysis.—Calcd. for $C_{27}H_{14}Cl_4O_8S_4$ (percent): C, 39.1; H, 2.09; S, 19.0; Cl, 21.0. Found (percent): C, 39.2; H, 2.39; S, 18.9; Cl. 20.8.

$H^1$ NMR: Methyls as two peaks [6] at δ 3.80 and 3.86 and the exocyclic methine (CH) singlet [1] at δ 6.3.

IR: Carbonyl at 1720 cm.$^{-1}$ and double bond absorption at 1590 and 1560 cm.$^{-1}$.

EXAMPLE 17

2-(p-chlorobenzylidene)-4,5-diphenyl-1,3-dithiole

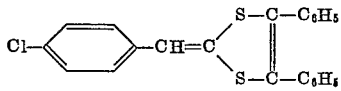

Tributylphosphine (20.2 g.) was added dropwise to 20 ml. of carbon disulfide with stirring under nitrogen. p-Chlorobenzaldehyde (20 g. in 70 ml. of ethyl ether) was added, the mixture was chilled in ice, and a solution of 18 g. of diphenylacetylene in 45 ml. of ethyl ether was added dropwise with stirring. There was no evidence of reaction. The mixture was warmed to room temperature and stirred overnight, and volatiles were removed under water-aspirator pressure. 1,2-dimethoxyethane (100 ml.) was added, and the mixture was refluxed for about 18 hours under nitrogen. Volatiles were removed as before. The crystals that formed in the residue on standing at room temperature for 12 days were separated by filtration, and additional solid product was obtained by adding methanol (about 30 ml.) to the filtrate. The total yield of crude 2-(p-chlorobenzylidene - 4,5 - diphenyl-1,3-dithiole was 23.8 g. (63%). Recrystallization from ethanol-ethyl acetate gave yellow material melting at 147–148°.

Analysis.—Calcd. for $C_{22}H_{15}ClS_2$ (percent): C, 69.73; H, 3.99; S, 16.92. Found (percent): C, 69.72; H, 4.09; S, 16.98; Cl, 9.66.

$H^1$ NMR: Aromatic CH at δ 7.25 and exocyclic CH at δ 6.45.

UV: In ethanol, 360 (ε 24,600), 350 (ε 25,000) and 243 nm. (ε 23,200).

IR: 1600 (m.), 1580 (s.), 1540 (s.), 1490 (s.), 1450 (m.), 1400 (m.), 1330 (m.), 1210 (m.), 1100 (m.), 1080 (m.), 1010 (m.), 835 (s.), 810 (m.), 775 (m.), 770 (m.), 745 (s.), 700 (s.).

EXAMPLE 18

4,5-diphenyl-2-(4-pyridylmethylidyne)-1,3-dithiole

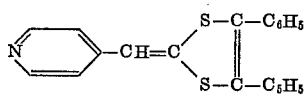

Tributylphosphine (20.2 g.) was added dropwise to a solution of 25.2 g. of carbon disulfide in 100 ml. of tetrahydrofuran under nitrogen at room temperature. 4-pyridinecarboxaldehyde (11 g.) and diphenylacetylene (18 g.) were added to the mixture and it was heated at reflux under nitrogen for 18 hours. The mixture was cooled and low-boiling material was removed under water-aspirator pressure. Methanol (30 ml.) was added to the residue and it was filtered to give 7.2 g. of solid, M.P. 63–100°. Recrystallization from ethanol gave yellow 4,5-diphenyl-2-(4-pyridylmethylidyne)-1,3-dithiole which melted at 105–106°.

*Analysis.*—Calcd. for $C_{21}H_{15}NS_2$ (percent): C, 73.0; H, 4.38; N, 4.06; S, 18.6. Found (percent): C, 69.8; H, 4.67; N, 3.78; S, 16.9.

The infrared spectrum showed carbon-carbon double bond absorption at 1580, 1530, and 1510 cm.$^{-1}$.

EXAMPLE 19

4-phenyl-2-(3-phenyl-2-propenylidene)-1,3-dithiole

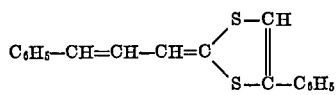

By essentially the method of Example 18, except that cinnamaldehyde (15 g.) and phenylacetylene (12 g.) were substituted for 4-pyridinecarboxaldehyde and diphenylacetylene and the mixture was heated at reflux (65°) for three days, 4-phenyl-2-(3-phenyl-2-propenylidene)-1,3-dithiole was prepared as 3.3 g. of solid which melted at 202–203°. Recrystallization from ethyl acetate gave golden crystals, M.P. 215–216°.

*Analysis.*—Calcd. for $C_{18}H_{14}S_2$ (percent): C, 73.4; H, 4.79; S, 21.8. Found (percent): C, 73.3; H, 4.74; S, 22.0.

UV: In methylene chloride, λ 392 ($\epsilon$ 33,500) and 260 nm. ($\epsilon$ 22,200).

IR: 3100 (m.), 3050 (m.), 1615 (m.), 1600 (m.), 1580 (m.), 1570 (m.), 1530 (m.), 1490 (m.), 1450 (m.), 1335 (m.), 1325 (m.), 1300 (m.), 1285 (m.), 1210 (m.), 1180 (m.), 1150 (m.), 1100 (m.), 1070 (m.), 1030 (m.), 950 (s.), 920 (m.), 900 (m.), 850 (m.), 840 (m.), 830 (m.), 805 (m.), 780 (m.), 740 (s.), 685 (s.).

EXAMPLE 20

2-p-chlorobenzylidene-4,5-bis(trifluoromethyl)-1,3-dithiole

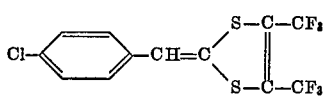

Tributylphosphine (20.2 g.) was added dropwise to 20 ml. carbon disulfide under nitrogen with stirring, here and throughout the process. The mixture was cooled in an ice bath, and p-chlorobenzaldehyde (20 g.) in 100 ml. of ether was added. Hexafluoro-2-butyne (17 g.) was passed into the reaction mixture over a one hour period. The mixture was kept in an ice bath for another two hours. Volatiles were removed in a rotary evaporator under water-aspirator pressure, and methanol (about 30 ml.) was added to the residue. The solid that precipitated was separated by filtration, and additional solid was obtained by concentrating and cooling the filtrate. Total yield of yellow 2-p-chlorobenzylidene-4,5-bis(trifluoromethyl)-1,3-dithiole was 25.4 g. After recrystallization from methanol the product melted at 73–74°.

*Analysis.*—Calcd. for $C_{12}H_5ClF_6S_2$ (percent): C, 39.72; H, 1.39; S, 17.68; Cl, 9.78; F, 31.42. Found (percent): C, 39.72; H, 1.51; S, 18.08; Cl, 9.58; F, 31.67.

H$^1$ NMR: Exocyclic CH [1] at δ 6.49 and aromatic CH pattern [4] centered at δ 7.26.

UV: In ethanol, λ 317 ($\epsilon$ 16,700) and 224 nm. ($\epsilon$ 12,300).

IR: 1620 (m.), 1580 (m.), 1560 (m.), 1490 (m.), 1400 (m.), 1280 (s.), 1160 (s.), 1090 (m.), 1010 (m.), 935 (m.), 840 (s.), 810 (m.), 725 (m.), 700 (m.).

EXAMPLE 21

2-benzylidene-4,5-bis(trifluoromethyl)-1,3-dithiole

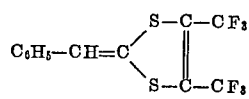

In essentially the procedure of Example 20, tenth-molar quantities of tributylphosphine, benzaldehyde, and hexafluoro-2-butyne and excess carbon disulfide gave 17.8 g. (54%) of yellow 2-benzylidene-4,5-bis(trifluoromethyl)-1,3-dithiole, M.P. 52–53°. Recrystallization from methanol raised the melting point to 57–58°.

*Analysis.*—Calcd. for $C_{12}H_6F_6S_2$ (percent): C, 43.90; H, 1.84; S, 19.53; F, 34.73. Found (percent): C, 43.92; H, 1.83; S, 20.10; F, 35.32.

H$^1$ NMR: Exocyclic CH [1] at δ 6.54 and aromatic CH multiplet [5] at δ 7.3.

UV: In ethanol, λ sh. 320 ($\epsilon$ 14,400), 310 ($\epsilon$ 15,900), sh. 232 ($\epsilon$ 11,500), and 223 nm. ($\epsilon$ 12,500).

IR: 1610 (s.), 1570 (m.), 1490 (m.), 1270 (s.), 1160 (s.), 1150 (s.), 930 (m.), 845 (m.), 830 (m.), 810 (m.), 750 (s.), 725 (s.), 700 (m.), 685 (s.).

EXAMPLE 22

2-p-nitrobenzylidene-4,5-bis(trifluoromethyl)-1,3-dithiole

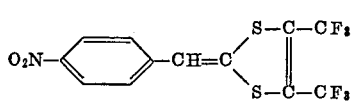

Again in essentially the procedure of Example 20, 0.05-molar amounts of tributylphosphine, p-nitrobenzaldehyde, and hexafluoro-2-butyne and excess carbon disulfide gave 14.8 g. (79%) of yellow 2-p-nitrobenzylidene-4,5-bis(trifluoromethyl)-1,3-dithiole, M.P. 155–156°. Recrystallization from ethanol did not change the melting point.

*Analysis.*—Calcd. for $C_{12}H_5F_6NO_2S_2$ (percent): C, 38.60; H, 1.35; N, 3.76; S, 17.18; F, 30.53. Found (percent): C, 38.57; H, 1.35; N, 3.77; S, 17.36; F, 31.21.

H$^1$ NMR: Exocyclic CH [1] at δ 6.85 and aromatic CH AB pattern [4] at δ 6.85 to 7.82.

UV: In ethanol, λ 382 ($\epsilon$ 18,900) and 251 nm. ($\epsilon$ 10,400).

EXAMPLE 23

2-benzylidene-4-phenyl-1,3-dithiole

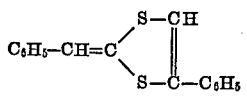

Tributylphosphine (20.2 g.) was added over one-half hour to 20 ml. of carbon disulfide under nitrogen with stirring. A solution of 20 g. of benzaldehyde in 100 ml. of ether was added. A solution of 11 g. of phenylacetylene in 15 ml. ether was added dropwise with stirring in ice. The mixture was stirred two hours in ice and kept at room temperature overnight. It was chilled and filtered to give yellow crystals of 2-benzylidene-4-phenyl-1,3-dithiole. Several additional crops were obtained by concentrating and chilling the filtrate. The total yield was 12.2 g. (46%). After recrystallization from ethanol the product melted at 205–206° (lit. M.P. 205–207°).

EXAMPLE 24

4-p-nitrobenzylidene-1,3-dithiole

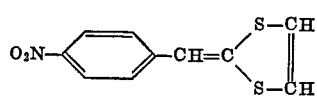

A mixture of 20.2 g. of tributylphosphine, 20 ml. of carbon disulfide, 16 g. of p-nitrobenzaldehyde, 75 ml. of tetrahydrofuran, and 5 g. of acetylene was heated at 100° for 8 hours in a closed stainless-steel bomb and cooled. The red crystals of 4-p-nitrobenzylidene-1,3-dithiole in the mixture were separated by filtration and washed with ether. Concentration and cooling of the filtrate gave two more crops. The total yield was 11.2 g. (47%). An analytical sample, M.P. 189–190°, was obtained by sublimation at 150° and 0.2 torr.

Analysis.—Calcd. for $C_{10}H_7NO_2S_2$ (percent): C, 50.61; H, 2.97; N, 5.90; S, 27.02. Found (percent): C, 50.34; H, 2.68; N, 6.06; S, 26.89.

IR: 1590 (m.), 1560 (m.), 1520 (m.), 1500 (m.), 1485 (s.), 1410 (m.), 1330 (s.), 1270 (m.), 1245 (m.), 1210 (m.), 1190 (m.), 1110 (s.), 1080 (m.), 860 (m.), 850 (m.), 800 (m.), 745 (m.), 690 (m.), 665 (m.).

UV: In methylene chloride, λ 392 (ε 33,500) and 260 nm. (ε 22,200).

EXAMPLE 25

2-p-methylbenzylidene-4-phenyl-1,3-dithiole

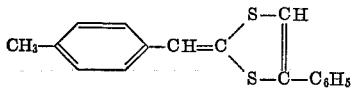

Tributylphosphine (20.2 g.) was added dropwise to 20 ml. carbon disulfide under nitrogen, with stirring here and through the heating period. A solution of 15 g. of p-tolualdehyde in 100 ml. ethyl acetate was added. A solution of 11 g. of phenylacetylene in 10 ml. of carbon disulfide was then added dropwise, and the mixture was heated at reflux under nitrogen for 18 hours. Cooling and filtration, followed by concentration and cooling of the filtrate, gave 5.7 g. (20%) of 2-p-methylbenzylidene-4-phenyl-1,3-dithiole in three crops. After recrystallization from ethyl acetate the product melted at 201°. Analysis was carried out on a separate, similarly prepared sample of the yellow product.

Analysis.—Calcd. for $C_{17}H_{14}S_2$ (percent): C, 72.27; H, 5.01; S, 22.71. Found (percent): C, 72.13; H, 5.27; S, 22.90.

IR: 3080 (w.), 2940 (w.), 1580 (m.), 1560 (m.), 1540 (m.), 1510 (m.), 1490 (m.), 1450 (m.), 1410 (m.), 1375 (w.), 1330 (m.), 1210 (w.), 1180 (m.), 1130 (m.), 1070 (m.), 1030 (m.), 920 (m.), 900 (m.), 840 (m.), 820 (m.), 740 (s.), 705 (m.), 680 (m.).

UV: In ethanol, λ 351 (ε 22,500) sh. 340 (ε 21,900) and 244 nm. (ε 24,100).

EXAMPLE 26

2-p-chlorobenzylidene-4-phenyl-1,3-dithiole

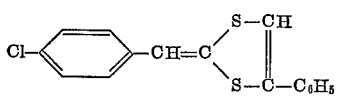

In essentially the procedure of Example 25, tenth-molar quantities of tributylphosphine, p-chlorobenzaldehyde, and phenylacetylene and excess carbon disulfide gave 9.7 g. (32%) of 2-p-chlorobenzylidene-4-phenyl-1,3-dithiole. After recrystallization from 1,2-dimethoxyethane the yellow product melted at 237–238°.

Analysis.—Calcd. for $C_{16}H_{11}ClS_2$ (percent): C, 63.45; H, 3.66; S, 21.18; Cl, 11.70. Found (percent): C, 63.70; H, 3.74; S, 21.10; Cl, 11.67.

UV: In ethanol, λ 362 (ε 24,600) and 247 nm. (ε 23,800).

IR: 1590 (s.), 1580 (m.), 1540 (s.), 1490 (m.), 1450 (m.), 1400 (m.), 1340 (m.), 1210 (m.), 1190 (m.), 1120 (m.), 1105 (m.), 1090 (m.), 1075 (m.), 1010 (m.), 925 (m.), 840 (s.), 815 (m.), 735 (s.), 700 (m.), 685 (m.), 670 (m.).

UTILITY

The novel products of this invention are useful for inhibiting vinyl polymerization as shown by the following example.

A solution containing 5 ml. of distilled acrylonitrile, 20 ml. of benzene, 0.1 g. of azo-bis(isobutyronitrile), and 3.0 g. of dimethyl 2-benzylidene-1,3-dithiole-4,5-dicarboxylate was heated at reflux under a nitrogen atmosphere for three hours. The red solution remained completely clear indicating the absence of polymerization of the acrylonitrile. A control reaction identical except for the absence of the benzylidene-dithiole showed initial separation of polymer after 20 minutes of heating. After 45 minutes of heating, polymer had completely filled the system and prevented stirring.

The products of this invention are also useful as dyes for fabrics. They are red, orange and yellow crystalline solids which can be isolated for use by precipitation with a nonsolvent or by evaporation. Fabrics can be dyed by immersion in a solution of a 2-arylidene-1,3-dithiole in dimethylformamide by a conventional vat-dyeing procedure.

I claim:
1. A compound of the formula

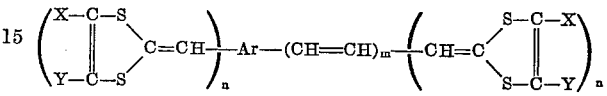

wherein:
Ar is a monovalent or divalent benzene radical unsubstituted or substituted with halogen, lower alkyl, lower alkoxy, or nitro, or a monovalent or divalent pyridine radical;
X and Y are hydrogen, lower alkoxycarbonyl, phenyl, carboxyl, cyano, or lower perfluoroalkyl; and
n is 0 or 1; $n_1$ is 0 or 1; $(n+n_1)$ is 1 or 2; and m is 0 or 1;
with the provisos that: when Y=H, $(n+n_1)=1$, and m=0, then X≠phenyl; and when X=H, $(n+n_1)=1$, and m=0, then Y≠phenyl.

2. A compound according to claim 1, dimethyl 2-benzylidene-1,3-dithiole-4,5-dicarboxylate.

3. A compound according to claim 1, tetramethyl 2,2'-(p-phenylenedimethylidyne)bis(1,3 - dithiole - 4,5-dicarboxylate).

4. A compound according to claim 1, methyl 2-(3-phenyl - 2 - propenylidene)-1,3-dithiole - 4 - carboxylate.

5. A compound according to claim 1, 4,5-diphenyl-2-(4-pyridylmethylidyne)-1,3-dithiole.

6. A compound according to claim 1, 2-p-chlorobenzylidene-4,5-bis(trifluoromethyl)-1,3-dithiole.

7. A process for making compounds of the formula

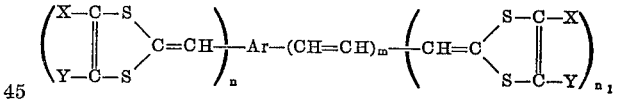

wherein:
Ar is a monovalent or divalent benzene radical unsubstituted or substituted with halogen, lower alkyl, lower alkoxy, or nitro, or a monovalent or divalent pyridine radical;
X and Y are hydrogen, lower alkoxycarbonyl, phenyl, carboxyl, cyano, or lower perfluoroalkyl; and
n is 0 or 1; $n_1$ is 0 or 1; $(n+n_1)$ is 1 or 2; and m is 0 or 1;
which comprises contacting and reacting an aromatic aldehyde with carbon disulfide and an acetylenic compound in the presence of a trihydrocarbylphosphine of the formula $R_3P$ wherein the R's may be the same or different and are lower alkyl, cycloalkyl of 5 or 6 carbons, or phenyl (lower alkyl), and at a temperature between about —50° C. and 200° C.

8. A process according to claim 7, comprising sequentially:
(a) mixing the carbon disulfide and phosphine to form a loose complex, and
(b) contacting this complex with the aromatic aldehyde and the acetylenic compound.

9. A process according to claim 7 wherein all R groups are the same and are lower alkyl.

10. A process according to claim 7 wherein the aromatic aldehyde is benzaldehyde and the acetylenic compound is dimethyl acetylenedicarboxylate.

11. A process according to claim 7 wherein the aromatic aldehyde is terephthalaldehyde and the acetylenic compound is dimethyl acetylenedicarboxylate.

12. A process according to claim 7 wherein the aromatic aldehyde is cinnamaldehyde and the acetylenic compound is methyl propiolate.

13. A process according to claim 7 wherein the aromatic aldehyde is pyridinecarboxaldehyde and the acetylenic compound is diphenylacetylene.

14. A process according to claim 7 wherein the aromatic aldehyde is p-chlorobenzaldehyde and the acetylenic compound is hexafluoro-2-butyne.

15. A process according to claim 7 wherein the aromatic aldehyde is benzaldehyde and the acetylenic compound is phenylacetylene.

References Cited

Mayer et al., J. Prakt. Chem. 4th Series, vol. 35, pp. 294 to 300 (1967).

Kirmse et al., Ann. Vol. 614, pp. 4–18 (1958).

Behringer et al., Tetrahedron Letters, vol. 20, pp. 1895–1899 (1967).

JOHN D. RANDOLPH, Primary Examiner

U.S. Cl. X.R.

252—380; 260—88.7 D, 240 R, 240.1, 327 M